United States Patent
Brown et al.

(10) Patent No.: US 7,519,630 B2
(45) Date of Patent: Apr. 14, 2009

(54) METHOD AND SYSTEM FOR AUTOMATED TESTING OF VERSIONED INFORMATION HANDLING SYSTEM APPLICATIONS

(75) Inventors: Michael E. Brown, Pflugerville, TX (US); Charles T. Perusse, Jr., Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1434 days.

(21) Appl. No.: 10/320,991

(22) Filed: Dec. 16, 2002

(65) Prior Publication Data

US 2004/0117413 A1    Jun. 17, 2004

(51) Int. Cl.
   *G06F 17/30* (2006.01)
(52) U.S. Cl. .......................... 707/203; 717/170; 713/1; 713/100
(58) Field of Classification Search .................. 707/100, 707/102, 200, 201, 203; 702/108, 123; 713/1, 713/2; 714/1, 2, 14, 25, 36–38, 46, 100; 717/100, 101, 136, 140, 168–170
See application file for complete search history.

(56) References Cited

U.S. PATENT DOCUMENTS

| | | | | |
|---|---|---|---|---|
| 5,784,636 A | | 7/1998 | Rupp | 395/800.37 |
| 6,297,820 B1 | | 10/2001 | Bloem et al. | 345/334 |
| 6,598,159 B1 | * | 7/2003 | McAlister et al. | 713/2 |
| 6,615,166 B1 | * | 9/2003 | Guheen et al. | 717/140 |
| 6,757,696 B2 | * | 6/2004 | Multer et al. | 707/201 |
| 2004/0030881 A1 | * | 2/2004 | Harrington et al. | |

OTHER PUBLICATIONS http://www.monzilla.org.tinderbox.html Mozilla.Org "Tinderbox" Nov. 11, 2002.
http://tinderbox.mozilla.org/showbuilds.cgi?tree=SeaMonkey Mozilla.Org "Tinderbox tree:SeaMonkey (06:19 PST)" Nov. 11, 2002.

* cited by examiner

*Primary Examiner*—Debbie M Le
(74) *Attorney, Agent, or Firm*—Hamilton & Terrile, LLP; Robert W. Holland

(57) ABSTRACT

Automated testing of versioned information handling system applications is performed by automatically compiling currently available versions at regular time intervals throughout a development cycle and then automatically testing each compiled version on test information handling systems to detect errors associated with each compiled version of the application. For instance, production operating systems used to configure manufactured information handling systems are automatically tested at regular intervals during development so that versions of a complete operating system and application environment are properly integrated. Testing of the complete operating system and application environment of a production operating system is accomplished by interrupting power to test information handling systems and loading the production operating system with a PXE agent. Periodic compilation and testing of versions provides simplified identification and tracking of development errors.

20 Claims, 2 Drawing Sheets

METHOD AND SYSTEM FOR AUTOMATED TESTING OF VERSIONED INFORMATION HANDLING SYSTEM APPLICATIONS

BACKGROUND OF THE INVENTION

1. Field of the Invention

The present invention relates in general to the field of information handling system application development, and more particularly to a method and system for automated testing of versioned information handling system applications, such as production operating system applications.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The wide variety of information handling system hardware and software configurations presents difficulty to efficient manufacture of information handling systems. One solution to address the problem of manufacturing different information handling system hardware and software configurations is to use a factory process operating system to configure manufactured information handling systems with their commercial operating system and applications. For instance, once the hardware for an ordered information handling system is assembled, power is applied to the assembled hardware and the information handling system is booted up with a production operating system. The production operating system then guides the configuration of the information handling system with desired software. As an example, a production operating system includes a Linux kernel and production applications which perform the loading and configuration of the MICROSOFT WINDOWS operating system and OFFICE application suite, such as with an image download.

The creation of a production operating system to configure the software of manufactured information handling systems generally requires close coordination from a disparate group of developers preparing software code to address various aspects of manufacturing a wide variety of information handling systems. One difficulty with developing a production operating system is that testing of the production operating system calls for more than running an application on an information handling system; rather, the production operating system is itself a complete operating system and application environment that generally cannot be completely tested unless it is tested from power up of a test information handling system. During a production operating system development cycle, a number of versions of a production operating system may be completed, compiled and run on basic test units and still end up failing in a production environment. Such production environment failures are often difficult to debug since often the time between when an error is introduced and checked in as a new version and when the error arises is lengthy so that developers have to search through a number of version changes to locate the error. Development teams have difficulty ensuring that numerous developed versions of a production operating system will interact properly in a production environment that includes a wide variety of information handling system configurations.

SUMMARY OF THE INVENTION

Therefore a need has arisen for a system and method which aids in the testing of different versions of an application during an application development cycle, such as development of a production operating system.

A further need exists for a system and method which periodically tests versions of a production operating system to determine that versions developed by disparate groups for disparate information handling systems will interact properly in a production environment.

In accordance with the present invention, a system and method are provided which substantially reduce the disadvantages and problems associated with previous methods and systems for testing different versions of an application during a development cycle. Current versions of the application are automatically compiled at predetermined times during the application development cycle. Each automatically compiled current application version is then automatically tested on test information handling systems to periodically verify proper operation in a production environment or otherwise associate errors with a compiled application version.

More specifically, a production operating system is automatically periodically compiled and tested at regular intervals during a production cycle. At predetermined times during the development cycle, an autocompile engine determines the current versions of the production operating system that are checked in by developers and automatically compiles the current version. A test director automatically initiates testing of the compiled current version of the production operating system on test systems that are representative of manufactured information handling systems to test the reliability of the production operating system in a production environment. For instance, when a new compiled version of the production operating system is compiled for testing, a test engine interrupts power to the test information handling systems with a power cycle system to initiate a boot of the test information handling systems. A preboot execution environment (hereinafter "PXE") agent on each test information handling system boots with the current compiled production operating system from a PXE server associated with the test director. The test engine communicates with the test information handling systems to check for proper operation of the current compiled version of the production operating system and logs errors to a test log. Detected errors are reported to developers to allow for correction before additional versions of the production operating system are created to rely on the failed version.

The present invention provides a number of important technical advantages. One example of an important technical advantage is that the testing of different versions of an application during an application development cycle is automated so that errors in different versions are more easily identified and corrected. Detection of errors during the development cycle instead of after the deployment of the application helps to prevent development of numerous versions after the introduction of an error. If an error is detected in a compiled version, the error is more easily identified, addressed and corrected, thus resulting in reduced development time for the application.

Another example of an important technical advantage is that periodic compilation and testing of versions of a production operating system help to ensure that versions developed by disparate groups for disparate information handling systems will interact properly in a production environment. With development of a production operating system, periodic automated compilation and testing of current versions during the development cycle on a variety of information handling systems reduces the likelihood that an error will arise in the production environment. Automated testing helps to ensure testing of the production operating system at regular intervals on information handling systems with testing initiated from a power down state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Production of a wide variety of information handling system hardware and software configurations is made more efficient by loading a production operating system to help with software configuration. However, development of a production operating system for a wide variety of information handling systems often involves disparate groups of developers working on applications that interacts during production. The present invention reduces the time between when an error is introduced and caught during development of a production operating system or other application to improve the development process and reduce the risk of errors arising during production. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
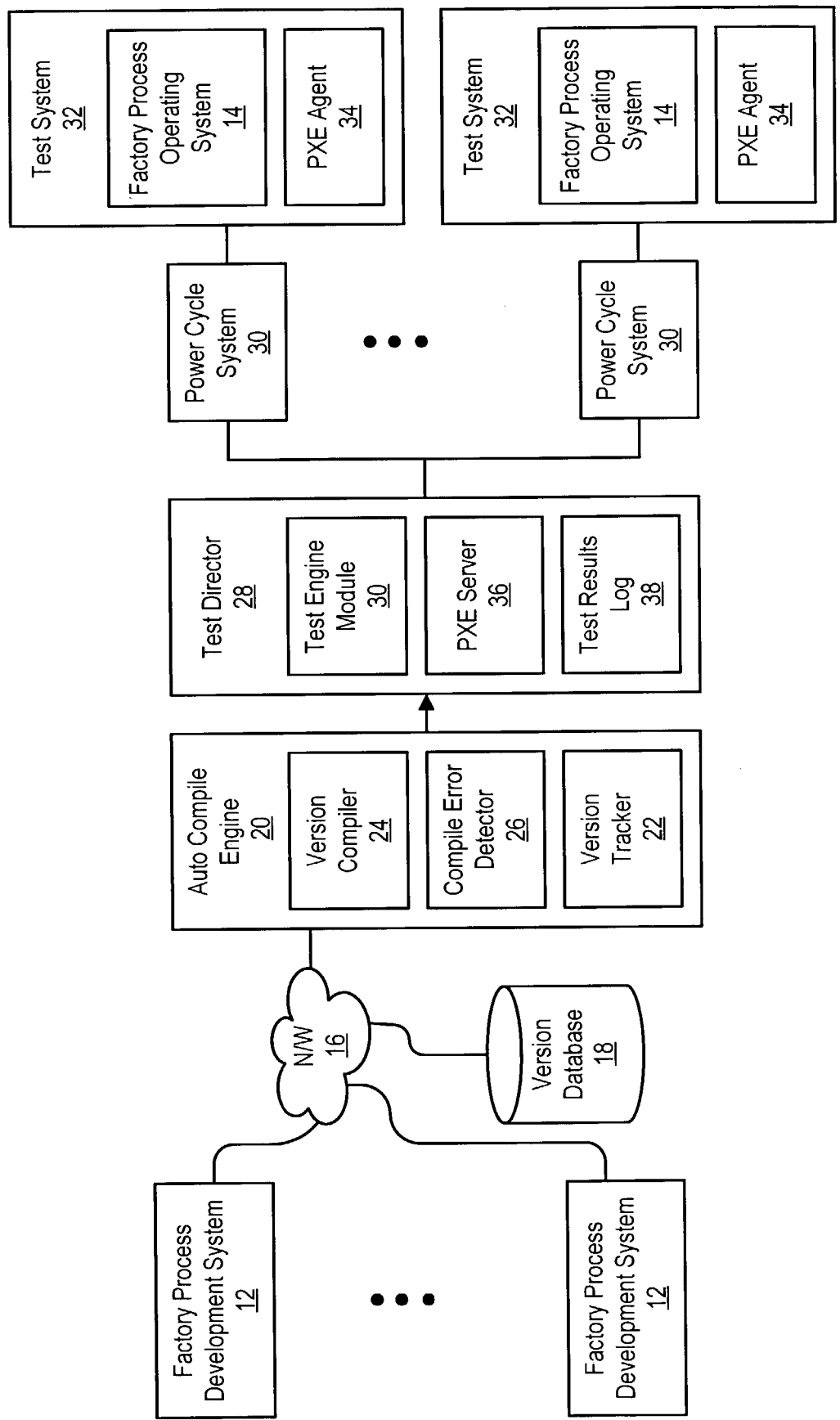
FIG. 1 depicts a block diagram of a system for auto compilation and testing of a production operating system.

Referring now to FIG. 1, a block diagram depicts a system 10 for auto compilation and testing of a production operating system. Factory process development information handling systems 12 are used to develop a factory process production operating system 14. Production operating system 14 loads on manufactured information handling systems after assembly of information handling system components in order to configure the information handling systems with commercial operating systems and applications. Production operating system 14 includes an operating system and application environment, such as a Linux kernel with applications for loading and configuring images downloaded to the information handling system. Factory process development systems 12 allow development of successive updated versions of production operating system 12 by disparate groups of development engineers interacting through a network 16 to retrieve and save versions to a version database 18. As different versions of production operating system 14 are completed, the completed versions are checked into version database 18.

An autocompile engine 20 interfaces with version database 18 through network 16 to compile the current version of production operating system 14 at regular periodic intervals and to forward the compiled current version of production operating system 14 for testing on test information handling systems. Autocompile engine 20 includes a version tracker 22 that determines the current production operating system at compile time and maintains a historical database of each compiled version for isolating bugs detected in testing. For instance, at regular intervals, such as once a day, version tracker 22 interacts with version database 18 to identify versions of production operating system 14 checked in as completed by factory process development systems 12. Version tracker 14 identifies the completed versions of production operating system 14 to a version compiler 24 which retrieves the current version of production operating system 14 from version database 18 and compiles the current version of the production operating system. A compile error detector 26 detects compile errors that may occur and sends a message to an appropriate factory process development system 12. For instance, a compile error message is sent to the factory process development system 12 that checked in the version that failed to compile.

Once autocompile engine 20 compiles the current version of production operating system 14, the compiled current version is provided to a test director 28. Test director 28 initiates testing of the current compiled version of production operating system 14 with a test engine module 30. Test engine module 30 directs the loading and running of the compiled current version on test information handling systems 32 by interrupting power with power cycle systems 30. Power cycle systems 30 interrupt power to selected test information handling systems 32 to initiate a re-boot. Upon re-boot a network bootable preboot execution environment (PXE) agent 34 contacts a PXE server 30 associated with test director 28 to boot with the current compiled version of production operating system 14. In this manner, production operating system is available for testing on a variety of hardware configurations for test information handling systems that are representative of manufactured information handling systems. In addition, production operating systems are tested in a production environment from power-up of test systems rather than as an application running on top of a normal operating system. Test engine module 30 communicates with test information handling systems 32 to simulate the production environment and tracks functional errors with test results log 38. Test director 28 reports detected errors to the factory process development systems 12 that developed the current production operating system version so that errors are addressed before additional development complicates error debugging.

Figure 2:
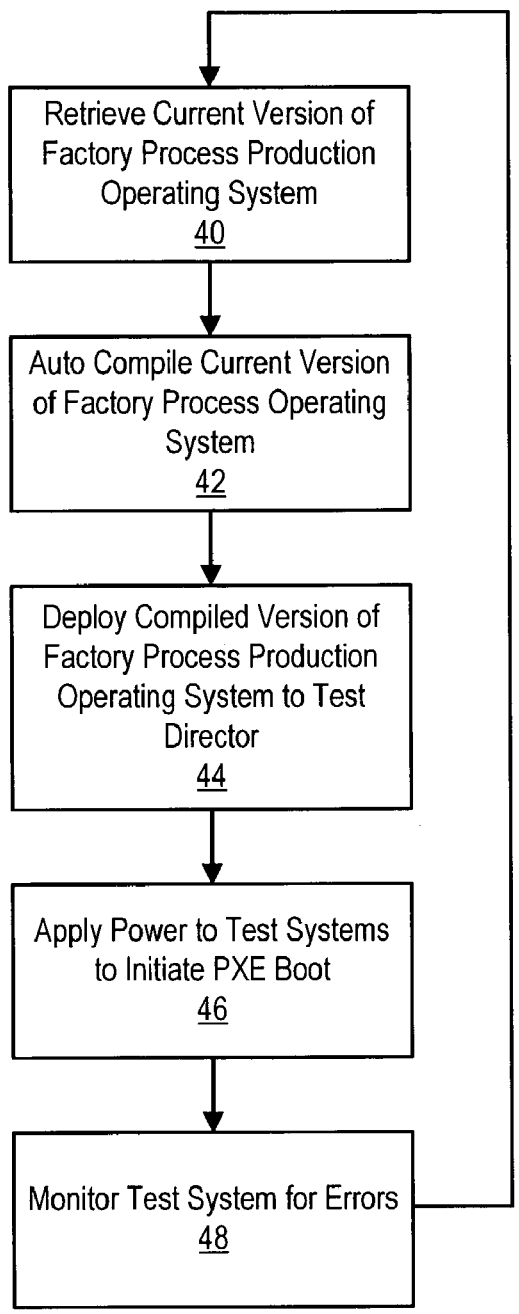
FIG. 2 depicts a process for auto compiling and testing of a production operating system.

Referring now to FIG. 2, a flow diagram depicts a process for auto compiling and testing of a production operating system. The process begins at step 40 by retrieving the current version of the factory process production operating system. The current version includes the checked-in modifications made by developers. At step 42, the current version production operating system is autocompiled at predetermined regular intervals. The time between autocompiles may be adjusted based on the development and testing cycles. At step 44, the compiled current version is deployed to the test director to initiate testing. Testing is initiated at step 46 by interrupting power to test information handling systems to initiate a network-based PXE with the compiled version. At step 48, errors are tracked and detected by monitoring test information handling systems for functional errors. FIG. 2 depicts a process that allows testing in a production environment by using test systems representative of production systems and booting with the test compiled version. In alternative embodiments, other types of applications may be developed and autocompiled for periodic testing with the present invention.

Although the present invention has been described in detail, it should be understood that various changes, substitutions and alterations can be made hereto without departing from the spirit and scope of the invention as defined by the appended claims.

What is claimed is:

1. A system for automated testing of information handling system application versions, the system comprising:
    plural application development systems operable to create plural versions of an application;
    an autocompile engine interfaced with the plural application development systems and operable to periodically compile the current application version; and
    a test director interfaced with the autocompile engine and operable to initiate testing of the compiled current application version on one or more test information handling systems and to detect faults in the compiled current application version.

2. The system of claim 1 further comprising:
    plural test information handling systems interfaced with the test director and operable to run the compiled application version; and
    a power cycle system associated with each test system, each power cycle system interfaced with the test director;
    wherein the test director initiates loading of the compiled current application version on the test information handling systems by interrupting power with the power cycle system to initiate boot of the test information handling systems.

3. The system of claim 2 further comprising:
    a preboot execution environment (PXE) agent associated with each test information handling system and operable to initiate boot from a distributed preboot execution environment (PXE) server; and
    a preboot execution environment (PXE) server associated with the test director and operable to provide the compiled current application to the preboot execution environment (PXE) agent.

4. The system of claim 1 wherein the application comprises a production operating system operable to load on a manufactured information handling system and to configure the information handling system.

5. The system of claim 4 wherein the production operating system comprises Linux.

6. The system of claim 1 wherein the autocompile engine periodically compiles the current application version at regular time intervals, the current application version comprising all application versions checked into the autocompile engine at a time interval.

7. The system of claim 1 further comprising a test results log associated with the test director, the test results log identifying errors detected at a test information handling system as associating the errors with an application version.

8. The system of claim 7 further comprising a compile error detector associated with the autocompile engine, the compile error detector identifying compile errors associated with the compilation of a current application version.

9. The system of claim 1 wherein the test director is further operable to initiate testing of the current application version on plural test information handling systems having hardware configurations representative of production hardware configurations.

10. A method for automated testing of versioned information handling system applications, the method comprising:
    developing plural versions of an application;
    checking in the plural versions of the application to a common location as each version is completed;
    automatically compiling checked in versions of the application at predetermined times;
    automatically testing each compiled version of the application on plural test information handling systems to detect errors associated with each compiled version of the application.

11. The method of claim 10 wherein the application comprises a production operating system for supporting manufacture of information handling systems.

12. The method of claim 11 wherein the production operating system comprises Linux.

13. The method of claim 10 wherein automatically testing further comprises:
    interrupting power to the test information handling systems; and
    booting the test information handling systems to call the compiled version of the application.

14. The method of claim 13 wherein booting the test information handling systems further comprises calling the compiled version of the application with a preboot execution environment (PXE) agent associated with each information handling system.

15. The method of claim 11 wherein the test information handling systems comprise hardware configurations representative of production hardware configurations.

16. The method of claim 10 further comprising:
    detecting errors on a test information handling system; and
    associating the detected errors with a version of the application.

17. An information handling system for testing versions of an application, the information handling system comprising instructions operable to:
    track plural versions of an application, the plural versions generated over a time period;
    automatically compile the versions at defined time intervals of the time period;
    automatically load each of the compiled versions on test information handling systems; and
    detect errors on the test information handling systems, each error associated with a compiled version.

18. The information handling system of claim 17 wherein the application comprises a production operating system operable to load on a manufactured information handling system and to configure the information handling system.

19. The information handling system of claim 18 wherein the instructions operable to automatically load each of the compiled versions further comprises instructions operable to:
    interrupt power to the test information handling systems; and provide the most recent compiled version of the application to a preboot execution environment (PXE) agent associated with each test information handling system.

20. The information handling system of claim 18 wherein the instructions operable to detect errors further comprises instructions operable to communicate with test information handling systems having the mast recent compiled version of the application loaded and running.

* * * * *